(12) United States Patent
Bieberdorf

(10) Patent No.: US 7,302,908 B1
(45) Date of Patent: Dec. 4, 2007

(54) COMBINATION AIRPORT AIR AND GROUND TRANSPORTATION MARKER AND AIRPORT TRAFFIC WAY

(76) Inventor: Roger Bieberdorf, 3060 N. Ridgecrest #115, Mesa, AZ (US) 85207

( * ) Notice: Subject to any disclaimer, the term of this patent is extended or adjusted under 35 U.S.C. 154(b) by 0 days.

(21) Appl. No.: 11/504,440

(22) Filed: Aug. 15, 2006

(51) Int. Cl.
*E01F 9/00* (2006.01)

(52) U.S. Cl. ..................... 116/63 P; 40/217

(58) Field of Classification Search ............ 116/63 P, 116/63 R, 209, DIG. 7, DIG. 16; 40/217, 40/584, 603, 604, 610, 612; 52/2.11, 2.24; 273/457; 404/9, 10
See application file for complete search history.

(56) References Cited

U.S. PATENT DOCUMENTS

| | | | |
|---|---|---|---|
| 2,561,016 A * | 7/1951 | Ford et al. ..................... 40/603 |
| 2,800,099 A | 7/1957 | Baker | |
| 2,939,467 A * | 6/1960 | Hans-Meyer et al. ........ 52/2.13 |
| 3,066,896 A | 12/1962 | Schirtzinger | |
| 3,334,554 A * | 8/1967 | Adams ...................... 116/63 P |
| 3,720,181 A * | 3/1973 | Elkins ....................... 116/63 P |
| 3,795,220 A | 3/1974 | Hengesbach | |
| 4,369,591 A * | 1/1983 | Vicino .......................... 40/610 |
| 5,122,797 A | 6/1992 | Wanasz | |
| 5,206,964 A * | 5/1993 | Wilson, Sr. .................... 5/417 |
| 5,244,302 A * | 9/1993 | Ollivier ......................... 404/10 |
| 5,672,123 A * | 9/1997 | Rudell et al. ................ 473/414 |
| 5,769,563 A * | 6/1998 | Flynn ........................... 404/15 |
| 5,815,966 A * | 10/1998 | Vestevich ..................... 40/217 |
| 5,865,564 A | 2/1999 | Miller et al. | |
| 6,024,510 A * | 2/2000 | Kamienchick ............... 404/15 |
| 6,363,661 B1 * | 4/2002 | Myers ........................ 52/2.13 |
| 6,641,329 B1 | 11/2003 | Clement | |
| 6,892,486 B2 * | 5/2005 | Haggard, Jr. ................ 40/604 |
| 7,162,836 B2 * | 1/2007 | Van Straaten ................ 52/2.24 |
| 2002/0104472 A1 | 8/2002 | Neubert | |
| 2002/0110424 A1 | 8/2002 | Page | |

* cited by examiner

*Primary Examiner*—Alexander R. Smith
(74) *Attorney, Agent, or Firm*—Parsons & Goltry; Michael W. Goltry; Robert A. Parsons

(57) ABSTRACT

A combination airport air and ground transportation marker and airport traffic way comprises broad, substantially coextensive first and second sheets of pliant material each having a perimeter edge formed with a fluid ballast bladder formed with a fluid inlet for permitting intake and outtake of fluid relative to the bladder for filling and relieving the bladder, and a relief vent for relieving pressure in the bladder during the filling of the bladder with fluid and the relieving of the bladder of fluid. The first sheet is splayed out onto an airport traffic way, and the second sheet is splayed out onto the airport traffic way overlying the first sheet of pliant material, whereby the first and second sheets cooperate forming a marker for the airport traffic way. A charge of fluid fills each of the bladders fluid ballasting the marker relative to the airport traffic way.

19 Claims, 3 Drawing Sheets

COMBINATION AIRPORT AIR AND GROUND TRANSPORTATION MARKER AND AIRPORT TRAFFIC WAY

BACKGROUND OF THE INVENTION

1. Field of the Invention

The present invention relates to aircraft communication and guidance and, more particularly, to airport transportation markers for directing air and ground airport traffic.

2. Related Art and Prior Art Statement

An airport is a place provided for the arrival and departure of aircraft, usually providing refueling, maintenance, repair, storage, and other facilities. Early airports, which were brought into being as the first aircraft flights were made in the early 1900's, consisted of wooden ramps and cleared downhill slopes which gave a smooth surface for acceleration to take-off speed. The basic function of an airport remains the same today, namely, to provide a strip of ground or paved runway along which an aircraft can gain the required air speed for it to obtain a lifting force from the aircraft wing equal to the weight of the total aircraft.

In the early days of aviation a large, open, grass-covered field, known as a "landing field," was the typical airport. The early aircraft were sensitive to wind direction, and it was important for them to be headed into the wind for both take-off and landing. These early aircraft were light enough to be supported by grass turf. In the 1920's and 1930's aircraft became heavier and required hard surfaces for operation. They were still sensitive to crosswinds, and the later airports provided several runways to minimize the crosswinds effect during take-off and landings.

As aircraft designs have been improved and as airplanes have become larger, heavier, and faster, they have become less sensitive to crosswinds. Modern transport aircraft have crosswind landing and take-off capabilities far in excess of those possessed by aircraft before the tricycle landing gear was initiated. Turbojet transports are certificated for 30- to 40-mph crosswind components. As a result, the need for multidirectional runways has been reduced.

With the growth of air traffic in the 1940's and 1950's came the subject of the number of runways necessary to provide sufficient capacity for high traffic volume areas. In the late 1950's a number of airports were equipped with dual runways to permit simultaneous landings and/or take-offs by two aircraft. Other configurations have included layouts where the runways radiate tangentially from the terminal area located in the center of the airport. The increased growth of air traffic since the 1950's has been met with an increased growth in the number of runways and the complexity of runway layouts.

Each runway should be served by a number of high-speed turn-off lanes. These are not "taxiways" in the earlier accepted sense of the word but rather high-speed "roll-out" lanes. It is essential that roll-out be accomplished with the minimum use of brakes and blasts of power. The spacing of the roll-out lanes should permit turn-offs at speeds of 60-70 mph. The controlling requirement is that the landing aircraft must clear the runway before the following aircraft reaches the last safe "go-around" position on final approach. Taxiway patterns from the entrance to the apron area to the take-off position should permit a smooth flow of traffic with no opposite direction paths and as few crossing paths as possible.

Runways and taxiways, which are often together referred to as "airport traffic ways," must often be closed to air and ground traffic for periodic maintenance and servicing. When an airport traffic way is closed, the closure must be communicated to air and ground traffic to prevent air and ground traffic from inadvertently accessing the closed area. The closure of an airport traffic way is often identified with the application of a marker to the designated airport traffic way, which is relatively large and easy to visualize by air and ground traffic. Although skilled artisans have provided the art with numerous examples of runway/taxiway closure markers, existing markers are either difficult and cumbersome to install, require an excessive amount of time and effort to install, are difficult to construct, or do not incorporate adequate anchoring structure. Given these and other deficiencies in the art, the need for continued improvement in the art of runway/taxiway closures is evident.

Accordingly, it is an object of the present invention to provide an airport air and ground transportation marker for an airport traffic way.

Another object of the present invention is to provide an airport air and ground transportation marker for an airport traffic way that is easy to construct and easy to install relative to an airport traffic way.

Yet another object of the present invention is to provide an airport air and ground transportation marker for an airport traffic way that utilizes fluid ballast bladders for anchoring the marker in place relative to an airport traffic way, and which provides superior resistance to wind disruption and which resists impact damage.

A further object of the present invention is to provide an airport air and ground transportation marker for an airport traffic way that is durable, and easy removed after use.

Yet a further object of the present invention is to provide an airport air and ground transportation marker for an airport traffic way that requires no physical modification to the airport traffic way in order to anchor it in place.

Yet still a further object of the present invention is to provide an airport air and ground transportation marker for an airport traffic way that requires no fasteners between the marker and the airport traffic way in order to anchor it in place.

Yet another object of the present invention is to provide a convenient, reliable, and economical method for closing runways and taxiway to air and ground airport traffic.

SUMMARY OF THE INVENTION

According to a preferred embodiment of the invention, a combination airport air and ground transportation marker and airport traffic way includes broad, substantially coextensive first and second sheets of pliant material each having a perimeter edge. A fluid ballast bladder is formed in the perimeter edge of each of the first and second sheets of pliant material. Each of the bladders is formed with a fluid inlet for permitting intake of fluid relative to the bladder for filling the bladder with fluid and outtake of fluid relative to the bladder for relieving the bladder of fluid, and a relief vent for relieving pressure in the bladder during the filling of the bladder with fluid and the relieving of the bladder of fluid. The first sheet of pliant material is splayed out onto an airport traffic way, the second sheet of pliant material is splayed out onto the airport traffic way overlying the first sheet of pliant material, and the first and second sheets of pliant material cooperate forming a marker for the airport traffic way. A charge of fluid fills each of the bladders fluid ballasting the marker relative to the airport traffic way. The inlets are each formed with a fluid valve movable between an open position opening the inlet permitting fluid flow through the inlet relative to the bladder and a closed position closing the inlet preventing fluid flow through the inlet relative to the bladder. The inlets are exposed relative to the perimeter edges of the first and second sheets, respectively, and the vents are exposed relative to the perimeter edges of the first and second sheets, respectively. Preferably, the sheets are each approximately 600 square feet in size, and the bladders each weigh approximately 420 pounds filled with water.

According to another preferred embodiment of the invention, a combination airport air and ground transportation marker and airport traffic way includes broad, substantially coextensive first and second sheets of pliant material having first and second perimeter edges, respectively, first and second perimeter sleeve structures formed in the first and second perimeter edges, respectively, and first and second fluid ballast bladders held by the first and second sleeve structures, respectively. The first bladder is formed with a first fluid inlet for permitting intake of fluid relative to the first bladder for filling the first bladder with fluid and outtake of fluid relative to the first bladder for relieving the first bladder of fluid, and a first relief vent for relieving pressure in the first bladder during the filling of the first bladder with fluid and the relieving of the first bladder of fluid. The second bladder is formed with a second fluid inlet for permitting intake of fluid relative to the second bladder for filling the second bladder with fluid and outtake of fluid relative to the second bladder for relieving the second bladder of fluid, and a second relief vent for relieving pressure in the second bladder during the filling of the second bladder with fluid and the relieving of the second bladder of fluid. The first sheet of pliant material is splayed out onto an airport traffic way, the second sheet of pliant material is splayed out onto the airport traffic way overlying the first sheet of pliant material, and the first and second sheets of pliant material cooperate forming a marker for the airport traffic way. A charge of fluid fills each of first and second bladders fluid ballasting the marker relative to the airport traffic way. The first inlet is formed with a first fluid valve movable between an open position opening the first inlet permitting fluid flow through the first inlet relative to the first bladder and a closed position closing the first inlet preventing fluid flow through the first inlet relative to the first bladder. The second inlet is formed with a second fluid valve movable between an open position opening the second inlet permitting fluid flow through the second inlet relative to the second bladder and a closed position closing the second inlet preventing fluid flow through the second inlet relative to the second bladder. The first and second inlets are exposed relative to the first and second perimeter edges of the first and second sheets, respectively, and relative to the first and second sleeve structures of the first and second sheets, respectively. The first and second vents are exposed relative to the first and second perimeter edges of the first and second sheets, respectively, and relative to the first and second sleeve structures of the first and second sheets, respectively. Preferably, the first and second sheets are each approximately 600 square feet in size, and the first and second bladders each weigh approximately 420 pounds filled with water.

According to yet another preferred embodiment of the invention, a combination airport air and ground transportation marker and airport traffic way includes broad, substantially coextensive first and second sheets of pliant material having first and second perimeter edges, respectively. The first perimeter edge defines first sides that meet at first corners, which cooperate defining a first shape of the first sheet. The second perimeter edge defines second sides that meet at second corners, which cooperate defining a second shape of the second sheet. First and second perimeter sleeve structures are formed in the first and second perimeter edges, respectively. First gaps are formed in the first sleeve structure at the corners of the first sheet, second gaps are formed in the second sleeve structure at the corners of the second sheet. First and second flexible fluid ballast bladders are held by the first and second sleeve structures, respectively. The first bladder conforms to the shape of the first sheet defined by the first perimeter edge, and segments of the first fluid ballast bladder are exposed at the gaps in the first sleeve structure at the corners of the first sheet. The second bladder conforms to the shape of the second sheet defined by the second perimeter edge, and segments of the second fluid ballast bladder are exposed at the gaps in the second sleeve structure at the corners of the second sheet. The first bladder is formed with a first fluid inlet for permitting intake of fluid relative to the first bladder for filling the first bladder with fluid and outtake of fluid relative to the first bladder for relieving the first bladder of fluid, and a first relief vent for relieving pressure in the first bladder during the filling of the first bladder with fluid and the relieving of the first bladder of fluid. The second bladder is formed with a second fluid inlet for permitting intake of fluid relative to the second bladder for filling the second bladder with fluid and outtake of fluid relative to the second bladder for relieving the second bladder of fluid, and a second relief vent for relieving pressure in the second bladder during the filling of the second bladder with fluid and the relieving of the second bladder of fluid. The first sheet of pliant material is splayed out onto an airport traffic way, the second sheet of pliant material splayed out onto the airport traffic way overlying the first sheet of pliant material, and the first and second sheets of pliant material cooperate forming a marker for the airport traffic way. A first charge of fluid fills the first bladder causing the first bladder to apply a stretching force to the first sheet maintaining the first shape of the first sheet. A second charge of fluid fills the second bladder causing the second bladder to apply a stretching force to the second sheet maintaining the second shape of the second sheet. The first and second charges of fluid ballast the marker relative to the airport traffic way. The first inlet is formed with a first fluid valve movable between an open position opening the first inlet permitting fluid flow through the first inlet relative to the first bladder and a closed position closing the first inlet preventing fluid flow through the first inlet relative to the first bladder. The second inlet is formed with a second fluid valve movable between an open position opening the second inlet permitting fluid flow through the second inlet relative to the second bladder and a closed position closing the second inlet preventing fluid flow through the second inlet relative to the second bladder. The first and second inlets are exposed relative to the first and second perimeter edges of the first and second sheets, respectively, and relative to the first and second sleeve structures of the first and second sheets, respectively. The first and second vents are exposed relative to the first and second perimeter edges of the first and second sheets, respectively, and relative to the first and second sleeve structures of the first and second sheets, respectively. In the preferred embodiment, the first shape of the first sheet is a rectangular shape, whereby the first sides comprise opposed minor sides of the rectangular shape and opposed major sides of the rectangular shape, and the first corners comprise points at which ends of the minor sides meet ends of the major sides. In the preferred embodiment, the second shape of the second sheet is a rectangular shape, whereby the second sides comprise opposed minor sides of the rectangular shape and opposed major sides of the rectangular shape, and the second corners comprise points at which ends of the minor sides meet ends of the major sides. Preferably, the first and second sheets are each approximately 600 square feet in size, and the first and second bladders each weigh approximately 420 pounds filled with water.

BRIEF DESCRIPTION OF THE DRAWINGS

Referring to the drawings.

DETAILED DESCRIPTION OF PREFERRED EMBODIMENTS

Figure 1:
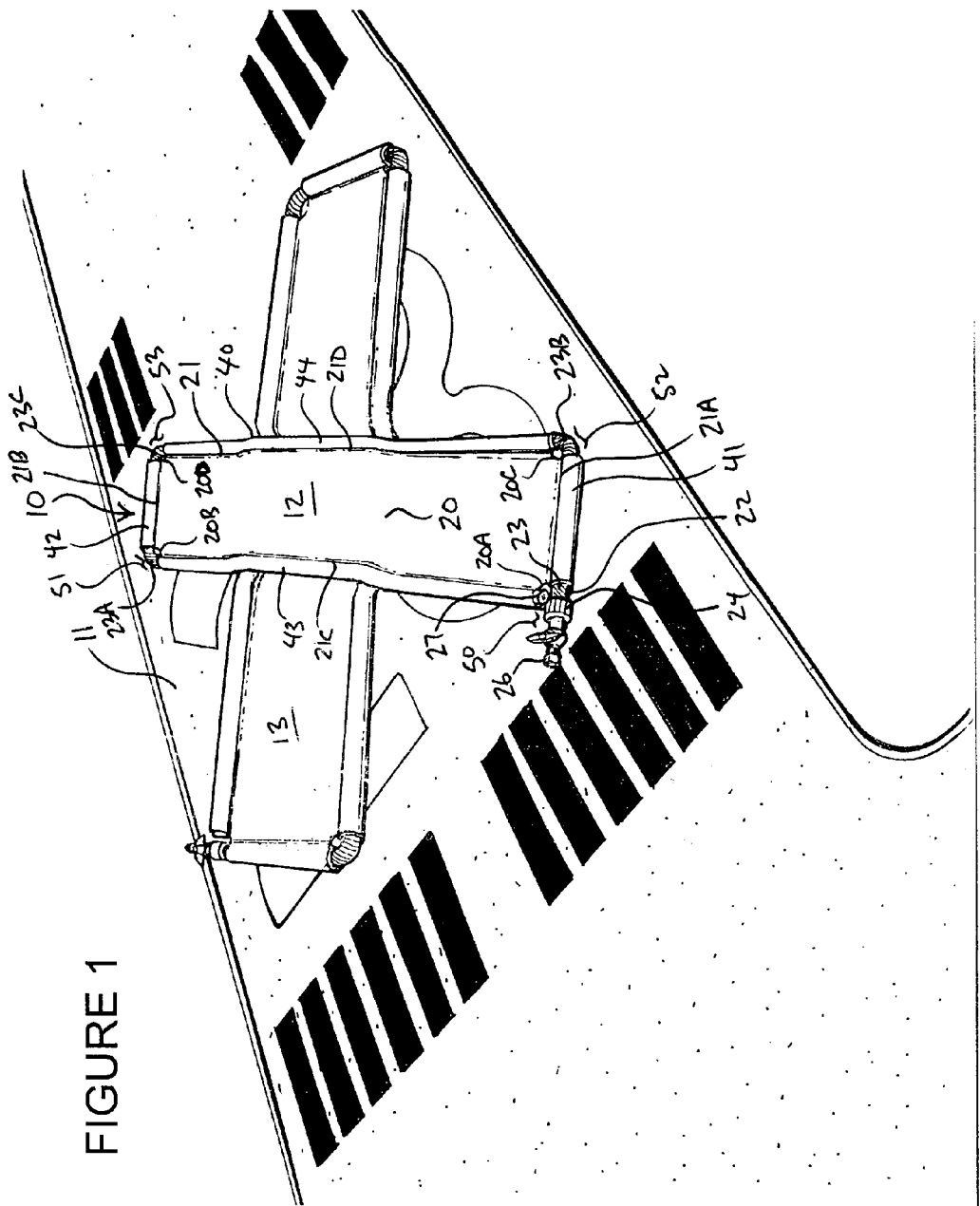
FIG. 1 is a perspective view of an airport air and ground transportation marker constructed and arranged in accordance with the principle of the invention and shown as it would appear deployed on an airport traffic way.

Turning now to the drawings, in which like reference characters indicate corresponding elements throughout the several views, attention is first directed to FIG. 1 in which there is seen a perspective view of an airport air and ground transportation marker 10 constructed and arranged in accordance with the principle of the invention and shown as it would appear deployed and set onto an airport traffic way designated generally at 11. Airport traffic way 11 is generally representative of an airport runway or taxiway. The placement of marker 10 on airport traffic way 11 marks the airport traffic way 11 as closed to air and ground traffic, such as for maintenance or servicing purposes or for other reasons, in accordance with the principle of the invention.

Marker 10 consists of a pair of marker elements 12 and 13 each incorporating a fluid bladder. Marker elements 12 and 13 are placed onto airport traffic way 11 such that they are associated with one another thereby cooperating and forming marker 10. After setting markers 12 and 13 in place, their respective bladders are filled with fluid, such as water, whereby the fluid-filled bladders ballast or otherwise anchor marker elements 12 and 13 relative to airport traffic way 11 and relative to each other. Marker elements 12 and 13 are identical relative to one another. Accordingly, a detailed discussion only of marker element 12 will be made with the understanding that the ensuing discussion of marker element 12 applies equally to marker element 13.

Marker element 12 consists of a broad sheet 20 of pliant material defining an outer perimeter edge 21 that in turn defines a shape of sheet 20. Sheet 20 is fashioned of durable, vinyl-coated fabric, such as polyester fabric, which is mildew resistant, resistant to ultra-violet light, and which is brightly colored providing superior visual appearance. Sheet 20 is preferably solid yellow in color according to current standards required for acceptable airport traffic way markers, although other bright colors can be used, if desired or if appropriate. In this preferred embodiment, perimeter edge 21 defines a rectangular shape of sheet 20, whereby perimeter edge 21 consists of opposed, parallel minor sides or edges 21A and 21B, that meet at right angles, namely, corners, with opposed, parallel major sides or edges 21C and 21D. The corners defined by sheet 20, of which there are four, are denoted generally at 20A, 20B, 20C, and 20D, respectively. Corners 20A and 20B are formed between minor edges 21A and 21B, and major edge 21C, and corners 20C and 20D are formed between minor edges 21A and 21B, and major edge 21D. Minor sides 21A and 21B are substantially equal in length relative to each other, and major sides 21C and 21D are substantially equal in length relative to each other. Minor sides 21A and 21B are each preferably approximately 10 feet in length, and major sides 21C and 21D are each approximately 60 feet in length, whereby sheet 20 is therefore approximately 600 square feet in size.

A fluid ballast bladder 22 is formed in perimeter edge 21 of sheet 20, which is adapted to take in and hold a charge of fluid, such as water. Bladder 22 is a unitary structure that runs along the entire length of perimeter edge and thereby encircles sheet 20, according to the principle of the invention.

Figure 3:
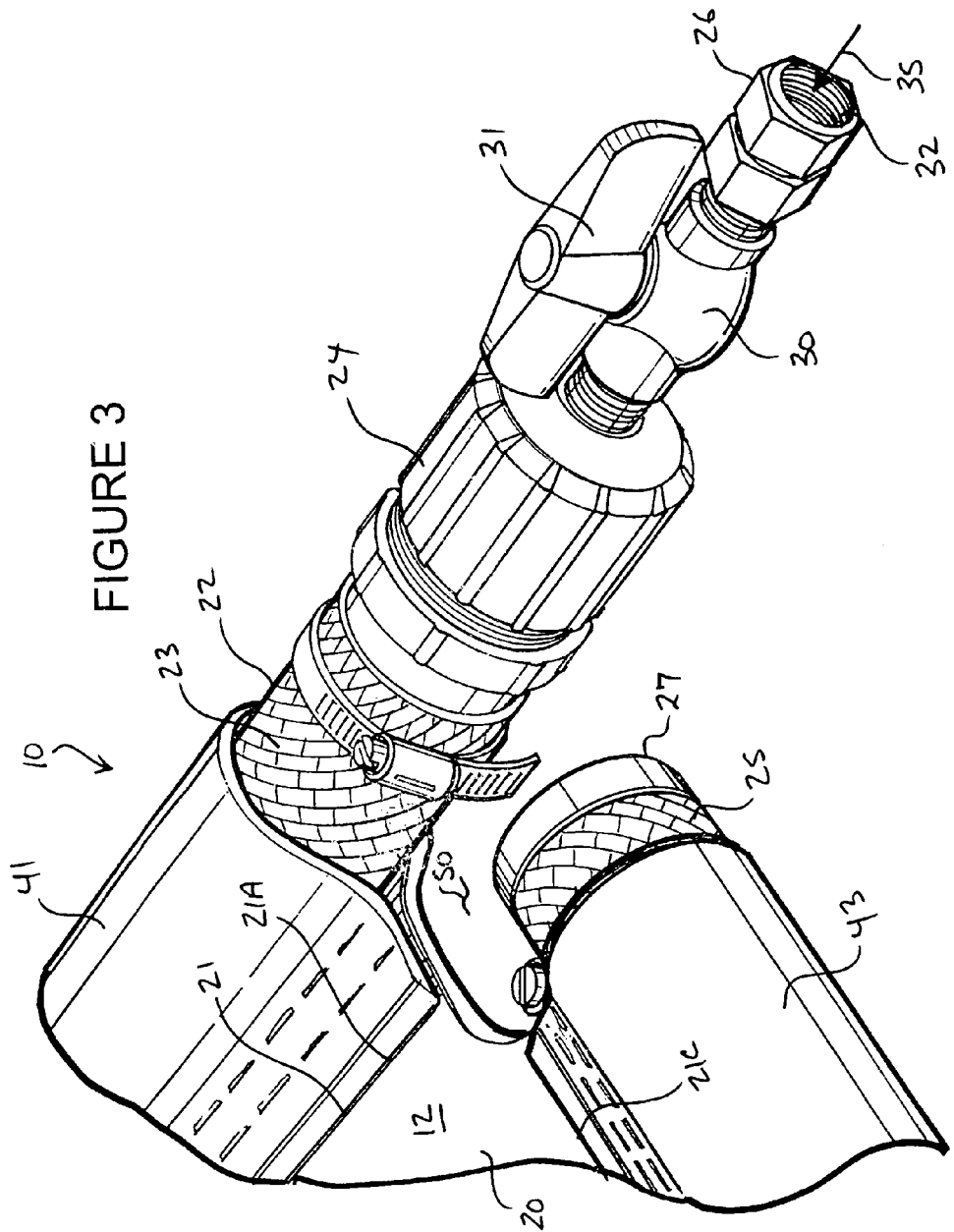
FIG. 3 is an enlarged fragmented perspective view of the airport air and ground transportation marker of FIG. 1.

Bladder 22 preferably consists of an elongate, flexible, 3-inch inner-diameter conventional fire hose 23 having opposing ends 24 and 25 as referenced in FIG. 3. A suitable fire hose that may be used for bladder 22 may include the Darley fire hose sold by Accurate Fire Equipment located in Franklin Square, N.Y., or other like fire hose which is mildew resistant, durable, and puncture resistant. According to the invention, end 24 is formed with an inlet 26 for permitting intake of fluid relative to hose 23 for filling hose 23 with fluid and outtake of fluid relative to hose 23 for relieving or emptying hose 23 of fluid. End 25 is formed with a relief vent/valve 27 for relieving air pressure in hose 23 during the filling of hose 23 with fluid and the relieving of hose 23 of fluid, in accordance with the principle of the invention.

Referring to FIG. 3, inlet 26 is formed with a fluid valve 30 movable between an open position opening inlet 26 permitting fluid flow through inlet 26 relative to hose 23 for filling and emptying hose 23, and a closed position closing inlet 26 preventing fluid flow through inlet 26 relative to hose 23. Fluid valve 30 a conventional and well-known fluid valve incorporating a knob 31 that when turned in a first direction, such as counter clockwise, opens inlet 26, and that when turned in a second opposing direction, such as clockwise, closes inlet 26. Relief vent/valve 27 is also entirely conventional and well known, and is movable through rotation between a first position opening it allowing air to pass therethrough relative to hose 23 and a second position closing it preventing air from passing therethrough relative to hose 23. Any suitable relieve vent/valve may be used without departing from the invention.

To fill hose 23 with a charge of fluid, such as water, relief vent/valve 27 and fluid valve 30 are each opened, and pressurized fluid, such as pressurized water, is applied into hose 23 through inlet 26. As fluid is applied into hose 23 through inlet 26, air pressure that builds up in hose 23 is relieved from hose 23 by relief vent/valve 27, whereby the relieving of air pressure in hose 23 with relief vent/valve 27 allows fluid to fill hose 23. After hose 23 is filled with a charge of fluid denoted generally by the reference character 35 in FIG. 3, relief vent/valve 27 and fluid valve 30 are each closed, thereby sealing ends 24 and 25 of hose 23 and maintaining the fluid admitted into hose 23. The internal diameter of hose 23 in conjunction with the overall length of hose 23 from end 24 to end 25 provides hose 23 with a capacity of approximately 50 gallons of fluid. Accordingly, hose 23 weighs approximately 420 pounds when water constitutes the charge of fluid 35 filling hose 23. To empty or relieve hose 23 of fluid after filling, relief vent/valve 27 and fluid valve 30 each need only be opened, whereby fluid will bleed outwardly from hose 23 through inlet 26.

Referring to FIG. 3, inlet 26 is formed with a threaded fitting 32, which is adapted to threadably receive a corresponding threaded end of a conventional garden hose or utility hose. Threaded fitting 32 allows inlet 26 to be threadably secured to a conventional garden or utility hose for providing a convenient way to secure inlet 26 to a source of pressurized water. Other forms of fittings may be used between inlet 26 and a source of pressurized fluid conducted by a garden or utility hose or other form of hose as may be desired according to the skill attributed to the skilled artisan.

Figure 2:
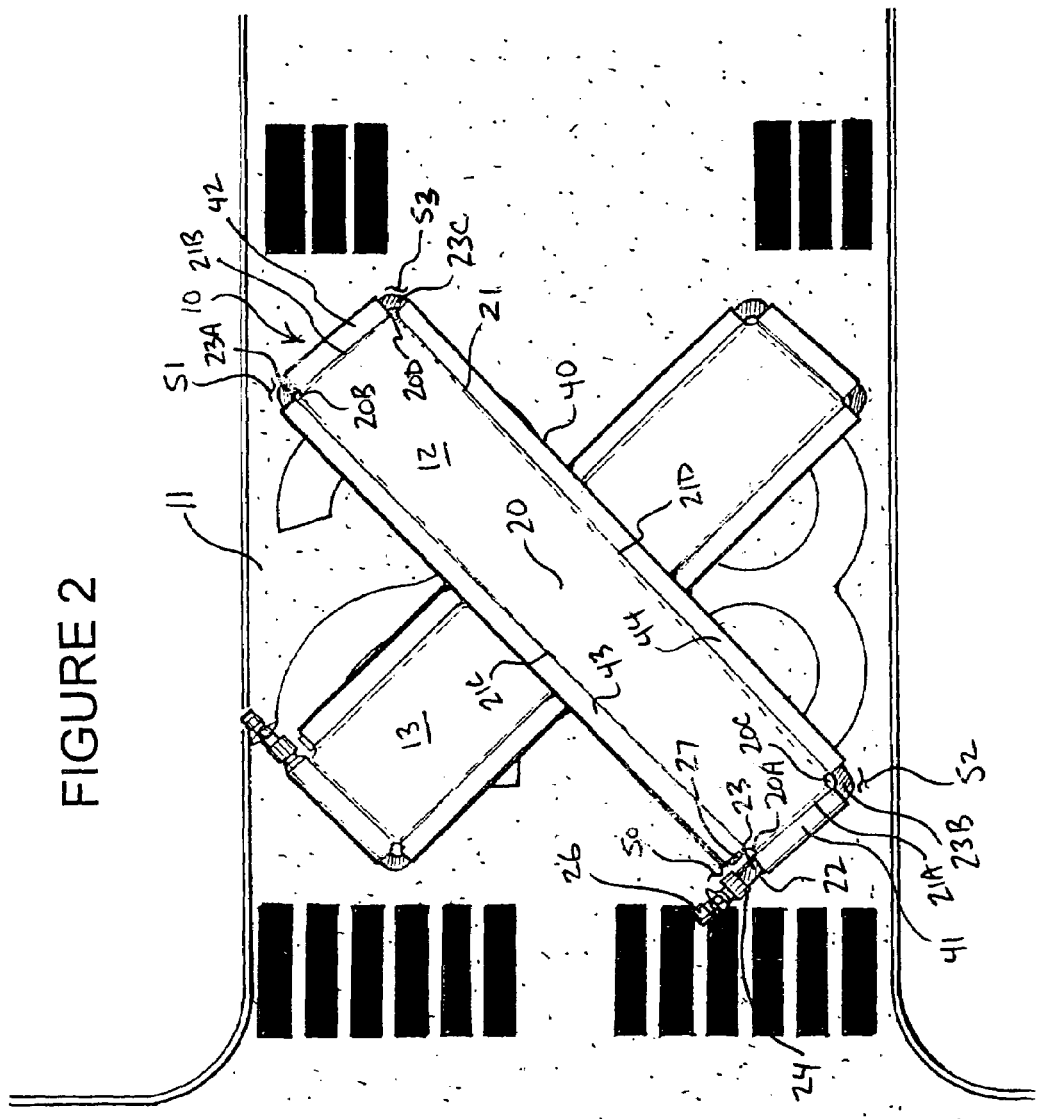
FIG. 2 is a top plan view of the airport air and ground transportation marker of FIG. 1 shown as it would appear deployed on the airport traffic way.

Because hose 23 is a fire hose, it is exceptionally strong and yet flexible and pliant and thereby easily influenced, highly resistant to puncture damage and breakage, and is able to maintain highly pressurized fluid. When filled with charge of fluid 35 as denoted in FIG. 3, hose 23 becomes relatively rigid and flexes radially outwardly away from perimeter edge 21 thereby applying a stretching force to sheet 20 maintaining the shape of sheet 20 as shown in FIGS. 1 and 2. In other words, charge of fluid 35 introduced into hose 23 introduces rigidity to hose thereby causing hose 23 to flex radially outwardly applying stretching forces to the sheet 20 maintaining the shape of sheet 20. Gaps 50-53 allow sheet 20 to shift relative to hose 23 as hose 23 is being filled, in accordance with the principle of the invention.

Given that fluid valve 30 and relief vent/valve 27 are each entirely conventional and well-known, further details thereof will readily occur to the skilled artisan and will not be discussed in further detail. Furthermore, it is to be understood that any suitable, conventional, or well-known relief vent/valve and fluid valve may be used in conjunction with hose 23 without departing from the nature and scope of the invention.

As previously indicated, bladder 22 is formed in perimeter edge 21 of sheet 20. To accomplish this in the preferred embodiment set forth herein, hose 23 is held by a perimeter sleeve structure 40 formed in perimeter edge 21. In the preferred embodiment disclosed herein, sleeve structure 40 consists of a plurality of sleeves, including sleeves 41 and 42 formed in minor edges 21A and 21B, respectively, and sleeves 43 and 44 formed in major edges 21C and 21D, respectively. Sleeves 41 and 42 extend along the entire lengths of minor edges 21A and 21B, respectively, and sleeves 43 and 44 extend along the entire lengths of major edges 21C and 21D, respectively. A gap 50 is formed between the opposed ends of sleeves 41 and 43 at corner 20A, a gap 51 is formed between the opposed ends of sleeves 42 and 43 at corner 20B, a gap 52 is formed between the opposed ends of sleeves 41 and 44 at corner 20C, and a gap 53 is formed between the opposed ends of sleeves 42 and 44 at corner 20D.

Sleeves 41-44 are each formed by extensions of sheet 20, which extend away from perimeter edge 21, and which terminate with outer extremities that are folded back toward sheet 20 and sewn thereto adjacent to perimeter edge 21. This aspect is clearly illustrated in FIG. 3 in conjunction with sleeves 41 and 43.

Hose 23 is received concurrently into and through sleeves 41-44 encircling sheet 20. The length of hose 23 from end 24 to end 25 is somewhat greater in overall length relative to the length of perimeter edge 21. Ends 24 and 25 of hose 23 intersect, and are located at, gap 50. Inlet 26 and fluid valve 30 at end 24 of hose 23 are exposed at gap 50 relative to sleeve structure 40 and sheet 20 including perimeter edge 21, as is relief vent/valve 27 at end 25 of hose 23, in accordance with the principle of the invention, providing unobstructed access to inlet 26 and fluid valve 30 and to relief vent/valve 27 for filling hose 23 with fluid and for relieving hose 23 of fluid as previously discussed. Sleeves 41-44 fit around and retain hose 23. Segments 23A, 23B, and 23C of hose 23 are exposed at gaps 51, 52, and 53, respectively, in sleeve structure 40 at corners 20B, 20C, and 20D, respectively.

To install hose 23 into sleeve structure 40, hose 23 is inserted end 25 first beginning at gap 50 sequentially into and through sleeves 41, 44, 42, and 43, respectively. Gaps 50-53 formed at the corners of sheet 20 are important as they provide access to hose 23 between the sleeves for allowing a user to maneuver hose 23 sequentially into and through sleeves 41, 44, 42, and 43, respectively. After installing hose 23 in sleeve structure 40, marker element 22 may be used for its intended purpose, which will be described presently.

To mark airport traffic way 11 with marker 10, the bladders of marker elements 12 and 13 should be free of fluid. Because the hoses and the sheets of marker elements 12 and 13 are each pliant, when their bladders are free of fluid marker elements 12 and 13 may be easily compactly folded or rolled up for storage during periods of nonuse, and then unfolded or unrolled for placement onto airport traffic way 11 for use in marking airport traffic way 11 as closed as will now be described.

To install marker 10 relative to airport traffic way 11, marker element 13 is unrolled or unfolded and splayed out onto airport traffic way 11 as shown in FIGS. 1 and 2 thereby splaying out its correspond sheet of pliant material. Marker element 12 is in turn unrolled or unfolded and splayed out onto airport traffic way 11 as shown in FIG. 1 overlying marker element 13 and thereby splaying out its correspond sheet 20 of pliant material. Marker elements 12 and 13 are laid out relative to one another such that they cooperate forming marker 10 for airport traffic way 11, is which marker 10 is formed in the shape of an "X" as shown in FIGS. 1 and 2 whereby marker elements 12 and 13 each form a leg of the "X" comprising the shape of marker 10. The bladders of marker elements 12 and 13 are each then filled with a charge of fluid as previously explained in conjunction with marker element 12, thereby fluid ballasting or anchoring marker 10 relative to airport traffic way 11, and fluid ballasting or anchoring marker elements 12 and 13 relative to each other, whereby the charges of fluid in bladders introduce rigidity to bladders thereby causing the bladders to flex radially outwardly applying stretching forces to the sheets of marker elements 12, and 13, respectively, maintaining the shapes of the sheets of marker elements 12 and 13, respectively, as shown in FIGS. 1 and 2.

Marker 10 is installed over the runway numbers, taxiway numbers, or at another selected location indicated by good practice for air and ground airport traffic control for identifying the designated airport traffic way as closed. Because the sheets of marker elements 12 and 12 are each approximately 600 square feet in size and solid yellow in color or otherwise brightly colored providing superior visual appearance, marker 10 provides a clear visual indication to air and ground airport traffic of the closure of airport traffic way 11 onto which it is placed, in accordance with the principle of the invention. To remove marker 10 from airport traffic way 11, the foregoing operation need only be reversed.

The ballast provided by the fluid-filled bladders of marker elements 12 and 13 provides convenient anchoring of marker elements 12 and 13 relative to each other and relative to airport traffic way 11 without having to employ additional fastening between marker elements 12 and 13 and between airport traffic way 11 and marker elements 12 and 13 to maintain the shape of marker 10 and to maintain marker 10 securely in place on airport traffic way 11. The ballast provided by the fluid-filled bladders of marker elements 12 and 13 also provides superior and surprisingly effective resistance of marker elements 12 and 13 to wind disruption and to damage as a result of vehicle or aircraft strikes, in accordance with the principle of the invention.

Those having regard for the art will readily appreciate that marker 10 herein disclosed is easy to install, and provides an convenient, reliable, and economical solution for closing airport traffic ways to air and ground airport traffic. Convenient, efficient, and highly reliable anchoring of marker 10 relative airport traffic way 11 is provided by fluid-filled bladders, whereby the bladders are easily filled during use and easily emptied during periods of nonuse allowing the marker elements 12 and 13 constituting marker 10 to be easily compactly folded or rolled up for storage. Because the ballast provided by the fluid-filled bladders of marker elements 12 and 13 eliminates the need for additional fasters between marker elements 12 and 13, and between airport traffic way 11 and marker elements 12 and 13, the cost of manufacturing marker 10 is significantly reduced, the cost of installing marker 10 relative to an airport traffic way is reduced, the need of modifying the airport traffic way with additional fastening structure for securing marker 10 is eliminated, and no specialized skill is required to install marker 10.

The invention has been described above with reference to preferred embodiments. However, those skilled in the art will recognize that changes and modifications may be made to the embodiments without departing from the nature and scope of the invention. The sizes and dimensions of the various components of marker 10 as herein specifically described, specifically the sizes and dimensions of the sheets and bladders of marker elements 12 and 13, are preferred sizes and dimensions and may be adjusted or varied as needed consistent with the described objects and advantages of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same,

The invention claimed is:

1. A combination airport air and ground transportation marker and airport traffic way, comprising:
    broad, substantially coextensive first and second sheets of pliant material each having a perimeter edge;
    a fluid ballast bladder formed in the perimeter edge of each of the first and second sheets of pliant material, each of the bladders formed with a fluid inlet for permitting intake of fluid relative to the bladder for filling the bladder with fluid and outtake of fluid relative to the bladder for relieving the bladder of fluid, and a relief vent for relieving pressure in the bladder during the filling of the bladder with fluid and the relieving of the bladder of fluid;
    the first sheet of pliant material splayed out onto an airport traffic way;
    the second sheet of pliant material splayed out onto the airport traffic way overlying the first sheet of pliant material;
    the first and second sheets of pliant material cooperating forming a marker for the airport traffic way; and
    a charge of fluid filling each of the bladders fluid ballasting the marker relative to the airport traffic way.

2. The combination airport air and ground transportation marker and airport traffic way according to claim 1, wherein the inlets are each formed with a fluid valve movable between an open position opening the inlet permitting fluid flow through the inlet relative to the bladder and a closed position closing the inlet preventing fluid flow through the inlet relative to the bladder.

3. The combination airport air and ground transportation marker and airport traffic way according to claim 1, wherein the inlets are exposed relative to the perimeter edges of the first and second sheets, respectively.

4. The combination airport air and ground transportation marker and airport traffic way according to claim 3, wherein the vents are exposed relative to the perimeter edges of the first and second sheets, respectively.

5. The combination airport air and ground transportation marker and airport traffic way according to claim 1, wherein the sheets are each approximately 600 square feet in size, and the bladders each weigh approximately 420 pounds filled with water.

6. A combination airport air and ground transportation marker and airport traffic way, comprising:
    broad, substantially coextensive first and second sheets of pliant material having first and second perimeter edges, respectively;
    first and second perimeter sleeve structures formed in the first and second perimeter edges, respectively;
    first and second fluid ballast bladders held by the first and second sleeve structures, respectively;
    the first bladder formed with a first fluid inlet for permitting intake of fluid relative to the first bladder for filling the first bladder with fluid and outtake of fluid relative to the first bladder for relieving the first bladder of fluid, and a first relief vent for relieving pressure in the first bladder during the filling of the first bladder with fluid and the relieving of the first bladder of fluid;
    the second bladder formed with a second fluid inlet for permitting intake of fluid relative to the second bladder for filling the second bladder with fluid and outtake of fluid relative to the second bladder for relieving the second bladder of fluid, and a second relief vent for relieving pressure in the second bladder during the filling of the second bladder with fluid and the relieving of the second bladder of fluid;
    the first sheet of pliant material splayed out onto an airport traffic way;
    the second sheet of pliant material splayed out onto the airport traffic way overlying the first sheet of pliant material;
    the first and second sheets of pliant material cooperating forming a marker for the airport traffic way; and
    a charge of fluid filling each of first and second bladders fluid ballasting the marker relative to the airport traffic way.

7. The combination airport air and ground transportation marker and airport traffic way according to claim 6, wherein the first inlet is formed with a first fluid valve movable between an open position opening the first inlet permitting fluid flow through the first inlet relative to the first bladder and a closed position closing the first inlet preventing fluid flow through the first inlet relative to the first bladder.

8. The combination airport air and ground transportation marker and airport traffic way according to claim 7, wherein the second inlet is formed with a second fluid valve movable between an open position opening the second inlet permitting fluid flow through the second inlet relative to the second bladder and a closed position closing the second inlet preventing fluid flow through the second inlet relative to the second bladder.

9. The combination airport air and ground transportation marker and airport traffic way according to claim 6, wherein the first and second inlets are exposed relative to the first and second perimeter edges of the first and second sheets, respectively, and relative to the first and second sleeve structures of the first and second sheets, respectively.

10. The combination airport air and ground transportation marker and airport traffic way according to claim 9, wherein the first and second vents are exposed relative to the first and second perimeter edges of the first and second sheets, respectively, and relative to the first and second sleeve structures of the first and second sheets, respectively.

11. The combination airport air and ground transportation marker and airport traffic way according to claim 6, wherein the first and second sheets are each approximately 600 square feet in size, and the first and second bladders each weigh approximately 420 pounds filled with water.

12. A combination airport air and ground transportation marker and airport traffic way, comprising:
   broad, substantially coextensive first and second sheets of pliant material having first and second perimeter edges, respectively;
   the first perimeter edge defining first sides that meet at first corners, which cooperate defining a first shape of the first sheet;
   the second perimeter edge defining second sides that meet at second corners, which cooperate defining a second shape of the second sheet;
   first and second perimeter sleeve structures formed in the first and second perimeter edges, respectively;
   first gaps formed in the first sleeve structure at the corners of the first sheet;
   second gaps formed in the second sleeve structure at the corners of the second sheet;
   first and second flexible fluid ballast bladders held by the first and second sleeve structures, respectively;
   segments of the first bladder exposed at the gaps in the first sleeve structure at the corners of the first sheet;
   segments of the second bladder exposed at the gaps in the second sleeve structure at the corners of the second sheet;
   the first bladder formed with a first fluid inlet for permitting intake of fluid relative to the first bladder for filling the first bladder with fluid and outtake of fluid relative to the first bladder for relieving the first bladder of fluid, and a first relief vent for relieving pressure in the first bladder during the filling of the first bladder with fluid and the relieving of the first bladder of fluid;
   the second bladder formed with a second fluid inlet for permitting intake of fluid relative to the second bladder for filling the second bladder with fluid and outtake of fluid relative to the second bladder for relieving the second bladder of fluid, and a second relief vent for relieving pressure in the second bladder during the filling of the second bladder with fluid and the relieving of the second bladder of fluid;
   the first sheet of pliant material splayed out onto an airport traffic way;
   the second sheet of pliant material splayed out onto the airport traffic way overlying the first sheet of pliant material;
   the first and second sheets of pliant material cooperating forming a marker for the airport traffic way;
   a first charge of fluid filling the first bladder causing the first bladder to apply a stretching force to the first sheet maintaining the first shape of the first sheet;
   a second charge of fluid filling the second bladder causing the second bladder to apply a stretching force to the second sheet maintaining the second shape of the second sheet; and
   the first and second charges of fluid ballasting the marker relative to the airport traffic way.

13. The combination airport air and ground transportation marker and airport traffic way according to claim 12, wherein the first inlet is formed with a first fluid valve movable between an open position opening the first inlet permitting fluid flow through the first inlet relative to the first bladder and a closed position closing the first inlet preventing fluid flow through the first inlet relative to the first bladder.

14. The combination airport air and ground transportation marker and airport traffic way according to claim 12, wherein the second inlet is formed with a second fluid valve movable between an open position opening the second inlet permitting fluid flow through the second inlet relative to the second bladder and a closed position closing the second inlet preventing fluid flow through the second inlet relative to the second bladder.

15. The combination airport air and ground transportation marker and airport traffic way according to claim 12, wherein the first and second inlets are exposed relative to the first and second perimeter edges of the first and second sheets, respectively, and relative to the first and second sleeve structures of the first and second sheets, respectively.

16. The combination airport air and ground transportation marker and airport traffic way according to claim 15, wherein the first and second vents are exposed relative to the first and second perimeter edges of the first and second sheets, respectively, and relative to the first and second sleeve structures of the first and second sheets, respectively.

17. The combination airport air and ground transportation marker and airport traffic way according to claim 12, wherein the first shape of the first sheet is a rectangular shape, whereby the first sides comprise opposed minor sides of the rectangular shape and opposed major sides of the rectangular shape, and the first corners comprise points at which ends of the minor sides meet ends of the major sides.

18. The combination airport air and ground transportation marker and airport traffic way according to claim 12, wherein the second shape of the second sheet is a rectangular shape, whereby the second sides comprise opposed minor sides of the rectangular shape and opposed major sides of the rectangular shape, and the second corners comprise points at which ends of the minor sides meet ends of the major sides.

19. The combination airport air and ground transportation marker and airport traffic way according to claim 12, wherein the first and second sheets are each approximately 600 square feet in size, and the first and second bladders each weigh approximately 420 pounds filled with water.

* * * * *